United States Patent [19]

Bland

[11] Patent Number: 4,533,366
[45] Date of Patent: Aug. 6, 1985

[54] EVAPORATION DEHYDRATOR
[75] Inventor: Linden Bland, Calgary, Canada
[73] Assignee: Murphy Oil Company Limited, Calgary, Canada
[21] Appl. No.: 593,987
[22] Filed: Mar. 27, 1984
[51] Int. Cl.$^3$ ............................................. B01D 19/00
[52] U.S. Cl. ......................................... 55/42; 55/45; 55/174; 55/175
[58] Field of Search ................. 55/38, 41, 42, 45, 172, 55/174, 175, 176; 210/750, 180

[56] References Cited

U.S. PATENT DOCUMENTS

| | | | |
|---|---|---|---|
| 2,656,006 | 10/1953 | Wilson | 55/175 |
| 2,786,543 | 3/1957 | Hayes et al. | 55/174 |
| 3,389,536 | 6/1968 | Bull | 55/175 |
| 3,405,509 | 10/1968 | Coggins | 55/174 |
| 4,342,572 | 8/1982 | Heath | 55/175 |

Primary Examiner—John Adee
Attorney, Agent, or Firm—Millen & White

[57] ABSTRACT

A method and apparatus for the treatment of oilfield heavy oil emulsions is provided. The method utilizes, in combination, the steps of evaporation, vapor/liquid separation, and solids settling to dehydrate, degassify and remove solids from the heavy oil emulsion and produce oil having less than 0.5% by volume basic solids and water.

The apparatus comprises an insulated, horizontal, cylindrical vessel. Mounted in the upper end of the vessel chamber is an inclined, tubular member having a closed upper end and an open lower end. At its closed end, the member forms a receiving chamber. A mechanical foam breaker extends transversely across the interior of the tubular member, downstream of the chamber. A stack of angularly inclined, heated trays, arranged in zigzag fashion, are positioned beneath the tubular member, to provide an elongate flowpath. The lower end of the tubular member is positioned to feed onto the upper end of the first tray. The flowpath formed by the stack of trays terminates at a level above the bottom of the vessel, so that a quiescent settling sump is provided by the base of the vessel. The vessel includes a feed inlet opening into the receiving chamber, a vapor outlet leading from the top of said vessel, and liquid and solids outlets leading from the sump.

A stream of pre-heated heavy oil emulsion is fed to the receiving chamber, wherein part of the contained water in the vapor form breaks out. The foaming stream is contained by the tubular member and is substantially disintegrated by the foam breaker. The stream then issues onto the upper end of the stack of trays and is heated as it passes as a shallow, broad layer over the trays, to gradually evaporate the remaining water from the emulsion and solids. The dehydrated solids are settled out in the sump, leaving oil containing less than 0.5% basic solids and water.

7 Claims, 3 Drawing Figures

EVAPORATION DEHYDRATOR

BACKGROUND OF THE INVENTION

1. Field of the Invention

The present invention relates to an evaporation dehydrator or treater, designed to vapourize and break out contained water from a pre-heated heavy oil emulsion feedstock by a sequential combination of evaporation, defoaming, and vapour-liquid separation steps. The treater is further adapted to hold the hot product under quiescent conditions in a sump zone for a pre-determined retention period, to settle out contained solids. The invention further relates to a method, comprising: pre-heating the feedstock to at least the boiling temperature of water, breaking out part of the contained water, defoaming the stream, heating the stream as it flows over a flowpath formed by a zigzag array of heated surfaces, to evaporate retained water, and retaining the dewatered product under quiescent conditions for a period of time, to settle out contained solids.

The apparatus and method find particular application in the treatment of thermal project production well streams.

2. Background

As stated, the invention finds application in the treatment of production streams produced from heavy oil reservoirs and in particular those using thermal recovery techniques.

Thermal recovery techniques, such as in situ combustion, steam injection, and cyclic steam injection and blowdown, are commonly used to produce heavy oil reservoirs. These procedures, as is well understood, are designed to reduce the viscosity of the immobile oil and improve its mobility to such an extert that it can be driven to a production well and recovered.

The production well streams from such thermal projects commonly comprise oil, water, gases and solids, usually tightly bound together in the form of an emulsion. The compositions can vary widely. In the specific instance of water content, it commonly is as high as 10% by volume.

In this state, the production is not saleable to pipeline operators. They commonly specify that the basic sediments plus water (BS&W) content must be less than 0.5% by volume.

As a result, thermal projection production must normally be "cleaned up" by water and solids removal.

This is attempted, in most cases, by heating the production and retaining it in a vessel to settle the water and solids. The cleaned oil is decanted and the water and solids are withdrawn from the base of the tank. To improve the operation, it is common to mix a chemical demulsifier with the production, prior to introducing it into the vessel. This operation is commonly referred to as a gravity settling treatment system.

When this type of system is relied on to clean up heavy oil thermal project production, the results are frequently poor. There are several reasons one can point to. Firstly, the density of the oil is so close to that of the contained water, that separation by settling is very slow. The high viscosity of the oil is another factor which interferes with settling. And finally, the emulsions which are involved are very stable, having been stabilized by fine solids and having been subjected to agitation by the gases co-produced with the oil.

As a case in point, the present invention was first used in conjunction with a steam drive project located at Lindbergh, Alberta. This project had to be shut down, because the conventional gravity settling treatment system used could not be operated to reduce the BS&W content below 1–5%, even though the production was repeatedly passed through the system.

The performance of a gravity settling treatment system can be significantly improved if a light hydrocarbon diluent is added to the emulsion, to increase the density differential between the oil and water. However, the diluent usually is not present on the project site and has to be brought in, which is expensive.

There is thus a need for a system adapted to clean up thermal project production to a BS&W content which is consistently below the maximum 0.5% specification. It would be particularly useful if such system were to be adapted to yield light hydrocarbons as a by-product, for use as a diluent in the free water knockout circuit used in conjunction therewith.

Turning now to the patent literature, there are several patents of which we are aware that are of interest. These are: U.S. Pat. Nos. 40,662 issued to Miller; 1,070,555 issued to Stone; 1,443,743 issued to Hess; and 1,528,968 issued to Brown.

SUMMARY OF THE INVENTION

The feedstock which is contemplated will usually be the emulsified production from a heavy oil thermal recovery project. In most cases, it will have been subjected already to free water knockout, perhaps involving the addition of a chemical demulsifier and/or light hydrocarbon diluent.

In any case, it will usually be an emulsion containing oil, water, gas, and some solids.

The feedstock is first pre-heated, for example with a glycol heat exchanger, to raise its temperature to at least the boiling temperature of water. Under normal circumstances, the pre-heating temperature will be in the range 212°–350° F.

The heated mixture is then introduced into a vessel, maintained at substantially atmospheric pressure, wherein it is treated sequentially as follows:

(1) it is introduced into a closed-in passageway or chamber formed by a substantially tubular member, wherein water vapour breaks out of the liquid;

(2) the foaming product is passed through mechanical defoaming means, positioned at an outlet from the passageway, wherein the foam is at least partly disintegrated;

(3) the product is then flowed as a shallow, broad stream down a zigzag stack of internally heated trays, to evaporate and break out water still entrained in the liquid or associated with the solids;

(4) the liquid product is then preferably retained for a predetermined period of time under quiescent conditions in a sump zone at the base of the vessel, wherein solids remaining in the oil may settle toward the floor of the zone;

(5) the vapors are vented from the vessel, the oil is decanted from the sump zone, and the solids in the base of said zone are drained as required.

By this means, we have been able to consistently produce oil meeting the pipeline specification requirements of 0.5% BS&W from the aforementioned thermal project.

Broadly stated, the invention comprises an apparatus for treating a pre-heated production well stream containing heavy oil, gas, solids, water and water vapor, comprising: a vessel forming an internal chamber and having inlet means at its upper end for admitting the incoming stream, first outlet means for removing produced vapour, and second outlet means at its lower end for removing produced liquid, said vessel being adapted to operate at substantially atmospheric pressure; a generally tubular member mounted in the chamber adjacent its upper end and forming an inclined, elongate passageway substantially closed in at its first end and along at least part of its length, said member having an outlet at its second end; said inlet means communicating with the first end of the passageway; means, extending transversely across the passageway at a point between its ends, for disintegrating foam present in the stream; and a plurality of internally heated, stacked, angularly inclined trays forming a zigzag flowpath along which the stream may flow in a downward direction, said trays being positioned in the vessel chamber so as to receive the stream issuing from the tubular member outlet and deliver it to a sump zone in the base of the vessel chamber; whereby part of the water vapor in the incoming stream may break out in the passageway, the foamy stream may be contained by the tubular member, at least some of the foam present in the incoming stream may be disintegrated by the transverse means, additional water remaining in the stream may be gradually vaporized and break out from the stream as it moves along the heated trays, and the stream may be collected for removal.

In another aspect, the invention is a method for treating an emulsified production well stream containing heavy oil, gas, solids and water, comprising: pre-heating the stream to a temperature which is at least the atmospheric boiling temperature of water and conducting it into a closed-in passageway, said passageway being maintained substantially at atmospheric pressure, and breaking out part of the contained water from the stream in the passageway; flowing the produced foamy stream through a foam breaker extending transversely across the passageway, to disintegrate at least part of the produced foam; distributing the product stream from the foam breaker onto the first of a stack of heated trays, positioned in a closed, insulated vessel maintained substantially at atmospheric pressure, said trays being arranged to provide a broad, downwardly descending zigzag flowpath, and flowing said stream as a shallow layer along said flowpath while simultaneously heating the stream by contact with the trays, to boil and break out contained water; venting the vaporized fraction from the vessel; and removing the cleaned product from the vessel.

DESCRIPTION OF THE PREFERRED EMBODIMENT

With reference to the drawings the heavy oil evaporation dehydrator referred to hereinafter as the treater 1 and the method for the treatment of heavy oil production will now be described.

Figure 1:
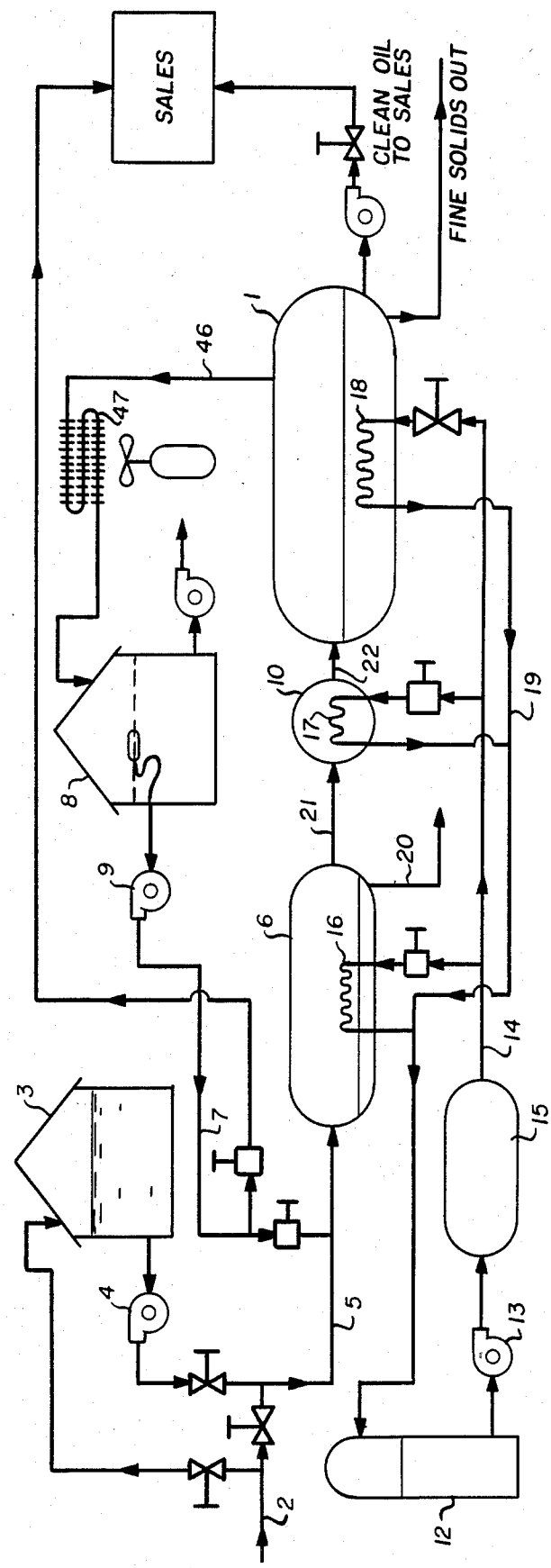
FIG. 1 is a schematic flowsheet showing the treater in a circuit, as employed at the Lindbergh pilot project.

A typical circuit, comprising the treater 1, is illustrated in FIG. 1. As shown, production from the wells arrives through the line 2 and is received in a storage tank 3. From the tank 3, the feedstock is fed, as required, by a variable speed pump 4 through a line 5 into a conventional free water knockout vessel 6. Under some operating conditions the tank 3 may be by-passed, the feedstock stream being introduced directly into line 5.

Light hydrocarbon diluent may be added to the feedstock passing through line 5. This diluent is fed through the line 7 into the line 5 from the condensate tank 8 by a variable speed pump 9.

If desired, chemical demulsifier may also be added to the production stream by adding it into line 7.

A heating system is provided to supply hot glycol for heat exchange in the knockout vessel 6, the pre-heater 10, and the trays 11 of the treater 1. This heating system comprises a surge tank 12, a pump 13 for feeding the glycol through a supply line 14, and a heater 15 positioned in the line 14. The hot glycol is fed through the line 14 to coils 16, 17 and 18 mounted in the knockout vessel 6, pre-heater 10 and treater trays 11, respectively. The heat-depleted glycol is returned from said coils to the surge tank 12 through return line 19.

In the knockout vessel 6, the feed mixture is retained for approximately 8 hours and heated by the coil 16 to a temperature in the order of 171° F. Some water and coarse solids settle out and are discharged through the vessel drain line 20. Typically, the stream discharged through the vessel drain line 20. Typically, the stream discharged from the knockout vessel 6 contains about 2–7% by volume BS&W.

The product from the knockout vessel 6 passes through the line 21 into a heat exchanger 10, referred to as the pre-heater. Here it is heated to a temperature in the range 212°–350° F., with the result that most or all of the contained water is vapourized. No significant back pressure is held on the pre-heater 10 in the case of the Lindbergh circuit, however, it is contemplated that this could be done, to produce a flashing effect in the treater 1.

Figure 2:
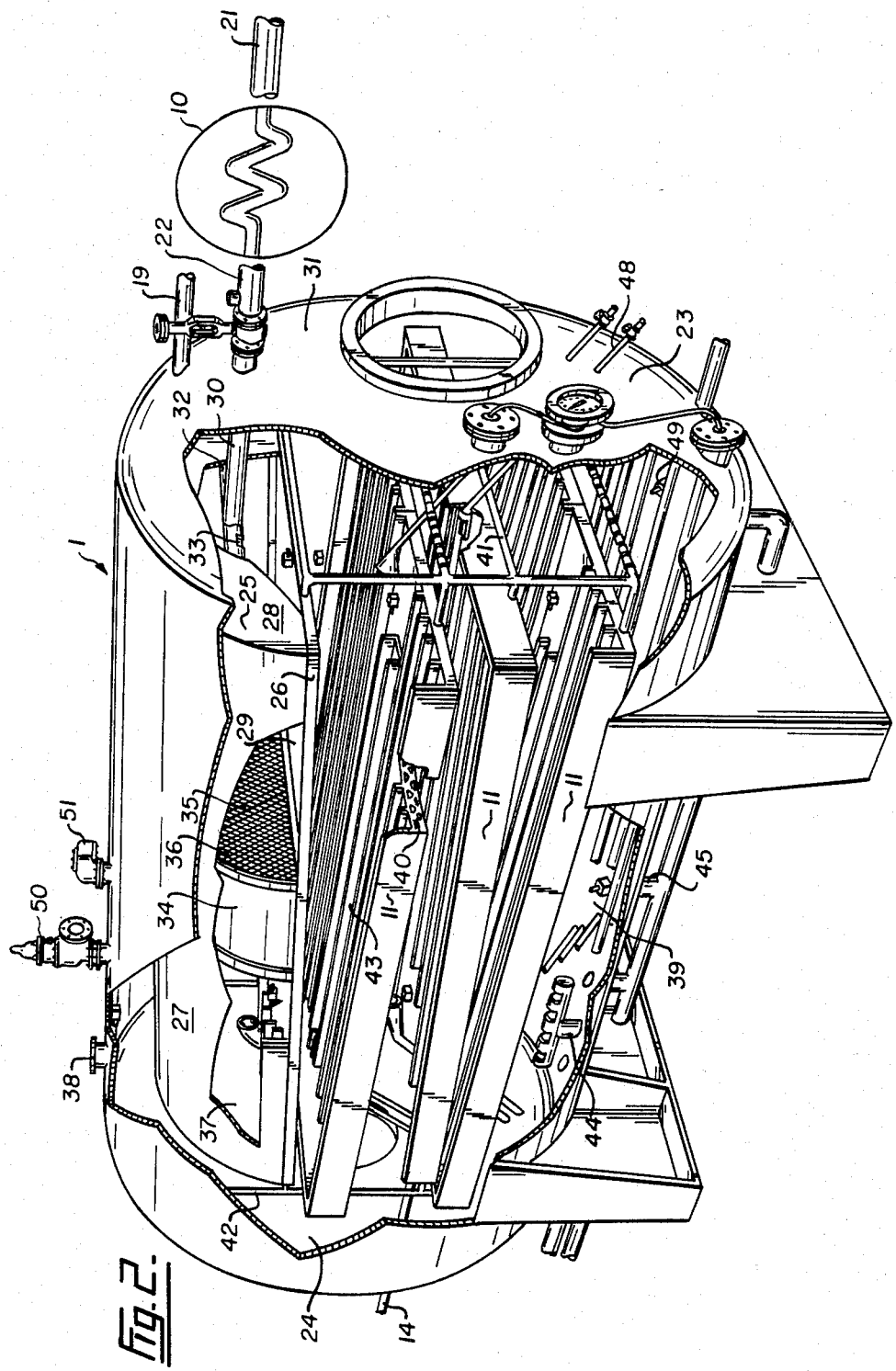
FIG. 2 is a perspective view showing the treater with its sidewall partly broken away, to show the vessel internals.
Figure 3:
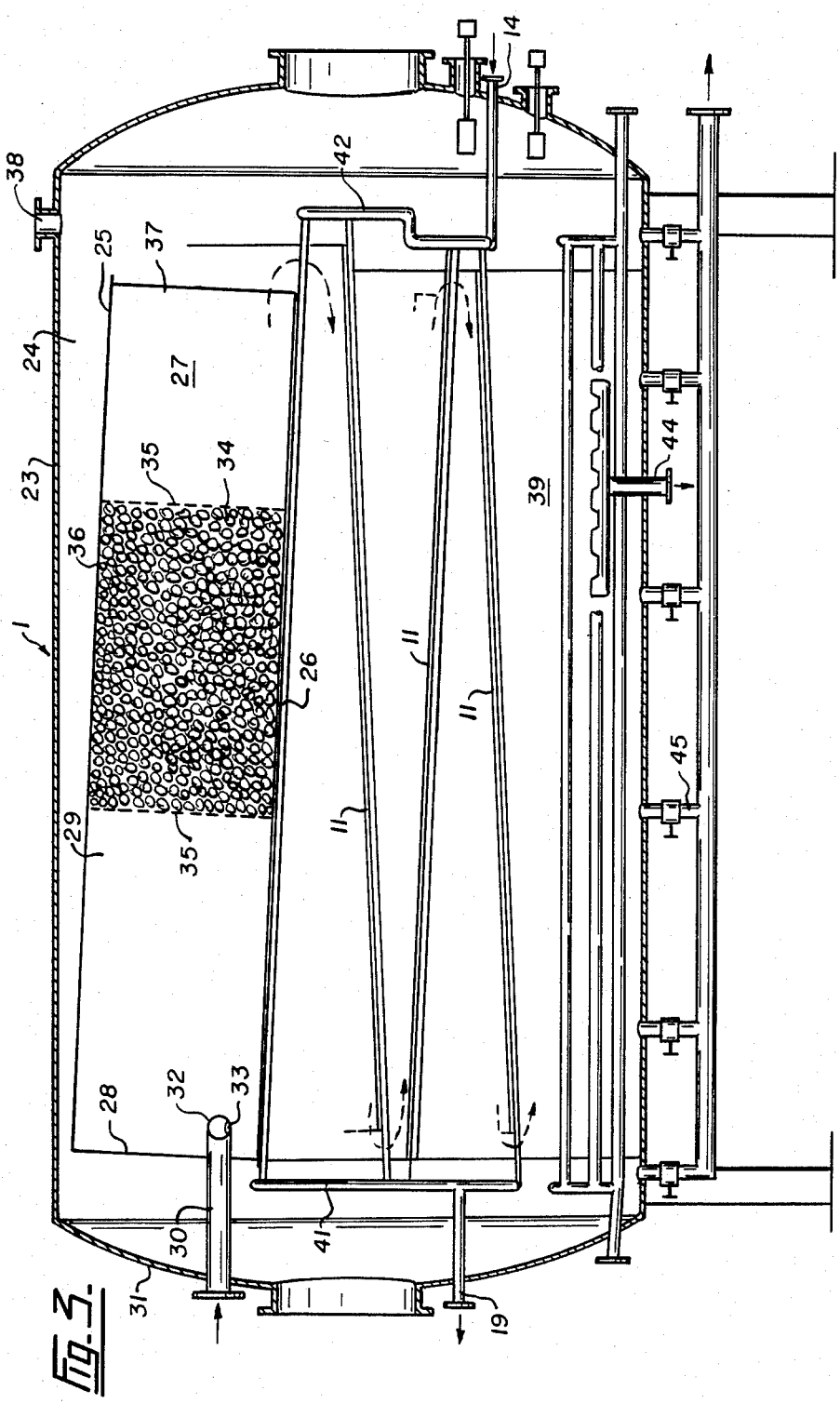
FIG. 3 is a sectional side view of the treater.

The heated emulsion issuing from the pre-heater 10 passes through the line 22 into the treater 1 as illustrated in FIG. 2 and 3.

The treater 1 comprises an elongate, horizontal, cylindrical, insulated vessel 23. This vessel 23 forms an internal chamber 24.

A generally tubular member 25 is positioned in the upper end of the treater chamber 24. More particularly, the member 25 comprises a broad tray 26 or floor member extending in a generally horizontal direction, but being downwardly inclined at a slight angle, so that fluid will flow by gravity from its upper end toward its lower end. A convex shroud 27 arches over the tray 26 and is sealed thereto along its side edges. An end wall 28 closes in the upper end of the tunnel or passageway formed by the tray and shroud. In summary, therefore, there is provided a tubular member 25, which is closed at its upper end and open at its lower end, and which forms a closed-in passageway 29 which is angularly inclined, to encourage gravity fluid flow therethrough.

Inlet means 30 are provided for introducing the pre-heated emulsion into the upper end of the passageway 29. Such inlet means 30 comprise the line 22, which extends from the pre-heater 10 through the vessel end wall 31 and tubular member end wall 28, and a transversely extending distributor pipe 32, connected to the line 22. The distributor pipe 32 has a plurality of openings 33 at spaced points along its length, for feeding the heated emulsion onto the tray 26 across its width.

At a point along the length of the tubular member passageway 29, there is provided means, referred to as the defoaming section 34, extending transversely across said passageway, for disintegrating or breaking down foam associated with the feed stream. Such defoaming section 34 comprises a pair of spaced apart screens 35 extending across the passageway and sealed to the tray 26 and shroud 27. A bundle of conventional pall rings 36 are packed between the screens 35, to cause the foam to break.

In operation, the heated emulsion is distributed across the width of the tray 26 at its upper end. Some water vapour breaks out of the stream as the stream moves downwardly along the length of the tray in the form of a shallow, broad stream. Much of the contained, vapourized water breaks out of the mixture and copious amounts of foam are present. The greatest part of the foam is disintegrated in the defoaming section 34. Liquid, still containing some water and water-containing solids, issues from the outlet 37 of the passageway 29. Vapour also exits as a separate stream from the passageway outlet 37 and is exhausted from the vessel chamber 24 through a vent 38.

A stack of angularly inclined trays 11 is positioned in the vessel chamber 24 to receive the liquid flow issuing from the passageway outlet 37. The trays 11 are arranged to form an elongate zigzag flowpath leading down to a sump zone 39 formed by the base of the vessel 23.

Each tray 11 has internal passages 40 comprising a coil 18. The inlet to the coil 18 is connected with the hot glycol feed line 14 by a line 42. The coil's outlet is connected with the return line 19 by a line 41.

Each tray 11 has a plurality of longitudinally extending, spaced apart, vertical fins 43 which serve the dual functions of providing efficient heat exchange and maintaining the flow well distributed across the width of the tray.

In use, the heated trays 11 cause vapourization of the water contained in the liquid and solids flow. The water vapour can effectively break out of the shallow streams. The hot trays 11 further function to maintain the temperature in the vessel chamber 24 at a sufficiently high level so as to preclude condensation of the water vapour.

The lower, downstream end of each tray 11 discharges onto the upper, upstream end of the next tray. The trays 11 are spaced apart vertically, so that the liquid overfalls created, as the flow drops from one tray to the next, function to help break down foam which has been generated.

After flowing over the heated trays 11, which comprise the evaporation section of the treater 1, the dehydrated, demulsified oil discharges into the sump zone 39, where it is retained for about 30 minutes. Solids remaining in the hot oil have an opportunity here to settle, under quiescent conditions.

The cleaned oil is decanted from the sump zone through the outlet pipe 44. The solids can be discharged through the bottom drains 45.

The vapours leaving through vent 38 pass through line 46 into a condenser 47 and are condensed. The liquid product passes into the condensate tank 8. Thus the system is adapted to produce the light end hydrocarbons used as diluent in the free water knockout step.

The following example is included to demonstrate the operability of the preferred embodiment of the treater, shown in the drawings, as used in a heavy oil stream drive recovery project conducted at Lindbergh, Alberta.

EXAMPLE

The treater used was in conformance with FIG. 2. It was operated in a circuit in accordance with FIG. 1. It comprised a vessel 23 formed by a 14'×8'×⅜" cylindrical steel shell having suitable welded heads. The vessel was insulated with 3" thick fibreglass retained in place by sheet aluminum.

Each of the four trays 26, 11 was disposed at a gradient of 1:16. The dimensions of each tray were 12'7"×7'.

Oil sampling ports, for example 48, were provided at the end of each tray, to permit monitoring of the BS&W cut. Temperature monitoring thermocouples, for example 49, were also provided, to measure temperatures at the pre-heater 10, in the tubular member 25, on the trays 11 and 26, and in the sump 39. Pressures in the pre-heater 10 and tubular member 25 were also recorded with suitable sensing means (not shown).

The clean oil was decanted through an oil outlet 44 positioned about 10" above the vessel floor.

A pressure relief valve 50, and vacuum relief valve 51 are provided on the upper section of the vessel as precautionary measures.

Following are data from the testing of this system.

TABLE 1

| LINDBERGH PLANT OPERATING CONDITIONS | | |
|---|---|---|
| | Metric Units | Imperial Units |
| FLOW RATE | | |
| Emulsion from FWKO to treater | 6.6 m³/hr | 1000 Bbls/day |
| Light end recycle rate to FWKO | .3 | 47 |
| Clean Oil out | 5.9 | 890 |
| TEMPERATURES | | |
| Fluid into FWKO | 60° C. | 140° F. |
| Emulsion out of FWKO & into Pre-heater | 77 | 171 |
| Emulsion and Vapour out of Pre-heater | 127 | 260 |
| Bottom end of tray 1 | 137 | 279 |
| Bottom end of tray 2 | 144 | 291 |
| Bottom end of tray 3 | 147 | 297 |
| Clean oil sump and out of treater | 149 | 300 |
| Vapour in treater & out to condensor | 137 | 279 |
| Condensed Light ends and water out of condenser | 22 | 72 |
| Glycol heating fluid supply to Pre-heater and treater | 156 | 313 |
| BS & W % | | |
| Fluid into FWKO | 80% | |
| Emulsion out of FWKO & into Pre-heater & treater | 6.4 | |
| Bottom end of tray 1 in the treater | 0.9 | |
| Bottom end of tray 2 | 0.8 | |
| Bottom end of tray 3 | 0.4 | |
| Clean oil sump and out to sales tank | 0.2 | |

TABLE II

| OIL ANALYSIS | | | | |
|---|---|---|---|---|
| | Raw Crude | *Oil Out of Atmospheric FWKO | *Oil Out of Treater | Light End Condensate |
| API @ 15.6° C. | 11.8 | 11.5 | 11.0 | 38.3 |
| BS & W % | 80.0 | 0.7 (.2% solids) | Trace | Trace |
| Specific Gravity | .9874 | .9895 | .9929 | .8333 |
| Sulphur Mass % | 4.4 | 4.5 | 4.65 | .84 |
| Total Salt g/m³ | 108 | 5.0 | 1202 | <.002 |
| Na by Trace Metal | — | 8.5 | 127.9 | — |

TABLE II-continued

OIL ANALYSIS

| | Raw Crude | *Oil Out of Atmospheric FWKO | *Oil Out of Treater | Light End Condensate |
|---|---|---|---|---|
| Analysis Mg/kg Ca by Trace Metal | — | 1.2 | 20.2 | — |
| Analysis Mg/kg Pour Point °C. | +19 | +19 | +19 | <−60 |
| Initial Boiling Point °C. | 186 | 190 | 195 | 50 |
| Viscosity MPa @ 40° C. | 3824 | 5174 | 6365 | 1.158 |
| @ 60° C. | 759.6 | 940.2 | 1181.0 | — |
| @ 80° C. | 223.6 | 257.1 | 302.9 | — |

*Note:
No light ends condensate was being recycled at the time these samples were gathered.

TABLE III

WATER ANALYSIS

| | Produced Water | Water Condensate |
|---|---|---|
| pH | 7.3 | 6.1 |
| Specific Gravity @ 15.4° C. | 1.0092 | 1.0002 |
| Total Solids (Calculated) Mg/L | 12,978 | 151 |
| NaCl Equivalent | 12,582 | 52 |
| Na | 4,500 | 3 |
| K | 72 | 0 |
| Ca | 278 | 2 |
| Mg | 106 | 1 |
| CL | 7,341 | 9 |
| HCO$_3$ | 641 | 135 |
| SO$_4$ | 39 | 1 |

The embodiments of the invention in which an exclusive property or privilege is claimed are defined as follows:

1. Apparatus for treating a pre-heated production well stream containing heavy oil, gas, solids, water and water vapor, comprising:

a vessel forming an internal chamber and having inlet means at its upper end for admitting the incoming stream, first outlet means for removing produced vapour, and second outlet means at its lower end for removing produced liquid, said vessel being adapted to operate at substantially atmospheric pressure;

a generally tubular member mounted in the chamber adjacent its upper end and forming an inclined, elongate passageway substantially closed in at its first end and along at least part of its length, said member having an outlet at its second end;

said inlet means communicating with the first end of the passageway;

means, extending transversely across the passageway at a point between its ends, for disintegrating foam present in the stream; and a plurality of internally heated, stacked, angularly inclined trays forming a zigzag flowpath along which the stream may flow in a downward direction, said trays being positioned in the vessel chamber so as to receive the stream issuing from the tubular member outlet and deliver it to a sump zone in the base of the vessel chamber;

whereby part of the water vapour in the incoming stream may break out in the passageway, the foamy stream may be contained by the tubular member, at least some of the foam present in the incoming stream may be disintegrated by the transverse means, additional water remaining in the stream may be gradually vapourized and break out from the stream as it moves along the heated trays, and the stream may be collected for removal.

2. The apparatus as set forth in claim 1 comprising:

a sump zone, positioned in the vessel chamber wherein the stream may be held for a pre-determined retention period, to allow solids to settle and remaining contained water vapour to break out.

3. The apparatus as set forth in claim 2 comprising:

heat exchanger means, external of the vessel, for heating the stream, just before it enters the vessel, to a temperature which is at least the boiling temperature of water at atmospheric conditions.

4. The apparatus as set forth in claim 3 wherein:

the vessel is insulated to retain heat.

5. The apparatus as set forth in claim 4 wherein:

each tray forms a multiplicity of spaced apart, internal passages distributed across the tray width, for the flow therethrough of heating fluid; and heating fluid inlet and outlet pipes extend through the vessel wall and communicate with said passages, for the supply and removal of heating fluid to maintain the trays at a temperature sufficiently high to ensure boiling of water contained in the stream and to prevent condensation of broken out water vapour.

6. A method for treating an emulsified production well stream containing heavy oil, gas, solids and water, comprising:

pre-heating the stream to a temperature which is at least the atmospheric boiling temperature of water and conducting it into a closed in passageway, said passageway being maintained substantially at atmospheric pressure, and breaking out part of the contained water from the stream in the passageway;

flowing the produced foamy stream through a foam breaker extending transversely across the passageway, to disintegrate at least part of the produced foam;

distributing the product stream from the foam breaker onto the first of a stack of heated trays, positioned in a closed, insulated vessel maintained substantially at atmospheric pressure, said trays being arranged to provide a broad, downwardly descending zigzag flowpath, and flowing said stream as a shallow layer along said flowpath while simultaneously heating the stream by contact with the trays, to boil and break out contained water;

venting the vaporized fraction from the vessel;

and removing the cleaned product from the vessel.

7. A method as set forth in claim 6 comprising:

retaining the stream issuing from the flowpath in a quiescent zone in the base of the vessel for a pre-determined retention time, to permit contained solids to settle out and remaining water vapour to break out.

* * * * *